(12) United States Patent
Wang et al.

(10) Patent No.: US 12,384,385 B2
(45) Date of Patent: Aug. 12, 2025

(54) ESTIMATING MOVING VEHICLE WEIGHT BASED ON DRIVING DATA

(71) Applicant: International Business Machines Corporation, Armonk, NY (US)

(72) Inventors: Yu Ying YY Wang, Xian (CN); Han Ying Song, Xian (CN); Deng Xin Luo, Xian (CN); Yong Wang, Xian (CN); Chi Nan, Xian (CN); Xiang Yu Yang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 18/124,759

(22) Filed: Mar. 22, 2023

(65) Prior Publication Data
US 2024/0317242 A1     Sep. 26, 2024

(51) Int. Cl.
*B60W 40/13*     (2012.01)
*G06N 5/022*     (2023.01)

(52) U.S. Cl.
CPC ............ *B60W 40/13* (2013.01); *G06N 5/022* (2013.01); *B60W 2510/02* (2013.01);
(Continued)

(58) Field of Classification Search
CPC ............ B60W 40/13; B60W 2510/02; B60W 2510/0638; B60W 2510/0657;
(Continued)

(56) References Cited

U.S. PATENT DOCUMENTS

2002/0161502 A1*   10/2002   McCaherty ............ G01G 19/08
                                                                             701/50
2017/0151892 A1*   6/2017   Kriger .................... G01G 19/44
(Continued)

FOREIGN PATENT DOCUMENTS

CN        109918972 A   *   6/2019
CN        110148230 A      8/2019
(Continued)

OTHER PUBLICATIONS

Xie et al. (CN114386892A), Transport vehicle load management method and system, storage medium andequipment; Jiangbell Automobile Shares Ltd Company. (Year: 2022).*
(Continued)

*Primary Examiner* — B M M Hannan
(74) *Attorney, Agent, or Firm* — Harrity & Harrity, LLP

(57) ABSTRACT

Mechanisms are provided for automatically predicting vehicle weight of a moving vehicle. Vehicle operation data is obtained from one or more on-board sensors/systems of the vehicle and features are extracted. The features are filtered based on a required working condition of the vehicle to identify intervals of features having valid feature data to thereby generate a filtered valid data. The filtered valid data is processed by a first artificial intelligence (AI) computer model based on time slices of the filtered valid data to generate a first prediction of vehicle weight, and by a second AI computer model based on buckets of key variables to generate a second prediction of vehicle weight. The first prediction is fused with the second prediction to generate a final prediction of vehicle weight which is output to downstream computing logic.

20 Claims, 6 Drawing Sheets

(52) U.S. Cl.
CPC .............. *B60W 2510/0638* (2013.01); *B60W 2510/0657* (2013.01); *B60W 2510/1005* (2013.01); *B60W 2510/18* (2013.01); *B60W 2520/00* (2013.01)

(58) Field of Classification Search
CPC ..... B60W 2510/1005; B60W 2510/18; B60W 2520/00; G06N 5/022
USPC ........................................................ 701/124
See application file for complete search history.

(56) References Cited

U.S. PATENT DOCUMENTS

| | | | | |
|---|---|---|---|---|
| 2019/0311289 | A1* | 10/2019 | Nguyen | G07C 5/0816 |
| 2022/0185204 | A1* | 6/2022 | Knafou | H04W 4/029 |
| 2023/0072343 | A1* | 3/2023 | Ko | G07C 5/0841 |
| 2023/0311943 | A1* | 10/2023 | Ravella | B60W 60/0053 |
| | | | | 701/23 |

FOREIGN PATENT DOCUMENTS

| | | | | |
|---|---|---|---|---|
| CN | 110807562 | A | * | 2/2020 |
| CN | 112046493 | A | * | 12/2020 |
| CN | 111089643 | B | * | 3/2021 |
| CN | 212963627 | U | * | 4/2021 |
| CN | 112819031 | A | | 5/2021 |
| CN | 114036830 | A | | 2/2022 |
| CN | 114386892 | A | * | 4/2022 |
| CN | 114020807 | A | | 8/2022 |
| CN | 116358678 | A | * | 6/2023 |
| KR | 100985734 | B1 | | 10/2010 |
| WO | WO-2022033288 | A1 | * | 2/2022 |

OTHER PUBLICATIONS

Wang et al. (WO2022033288), Overloaded Vehicle Identification Method, System, and Device; Huawei Tech Co Ltd. (Year: 2022).*
"sklearn.covariance.EllipticEnvelope", https://scikit-learn.org/stable/modules/generated/sklearn.covariance.EllipticEnvelope.html. Downloaded on Jan. 24, 2023, 6 pages.
Bosso, Mariana et al., "Use of regression trees to predict overweight trucks from historical weigh-in-motion data", Journal of Traffic and Transportation Engineering, Published Date Sep. 15, 2019, 17 pages.
Yadav, Deepshikha et al., "Low-cost triboelectric sensor for speed measurement and weight estimation of vehicles", IET Intelligent Transport Systems, Jul. 30, 2018, 8 pages.
Zhou, Yun et al., "Vehicle weight identification system for spatiotemporal load distribution on bridges based on non-contact machine vision technology and deep learning algorithms", Science Direct vol. 159, Jul. 15, 2020, 16 pages.

* cited by examiner

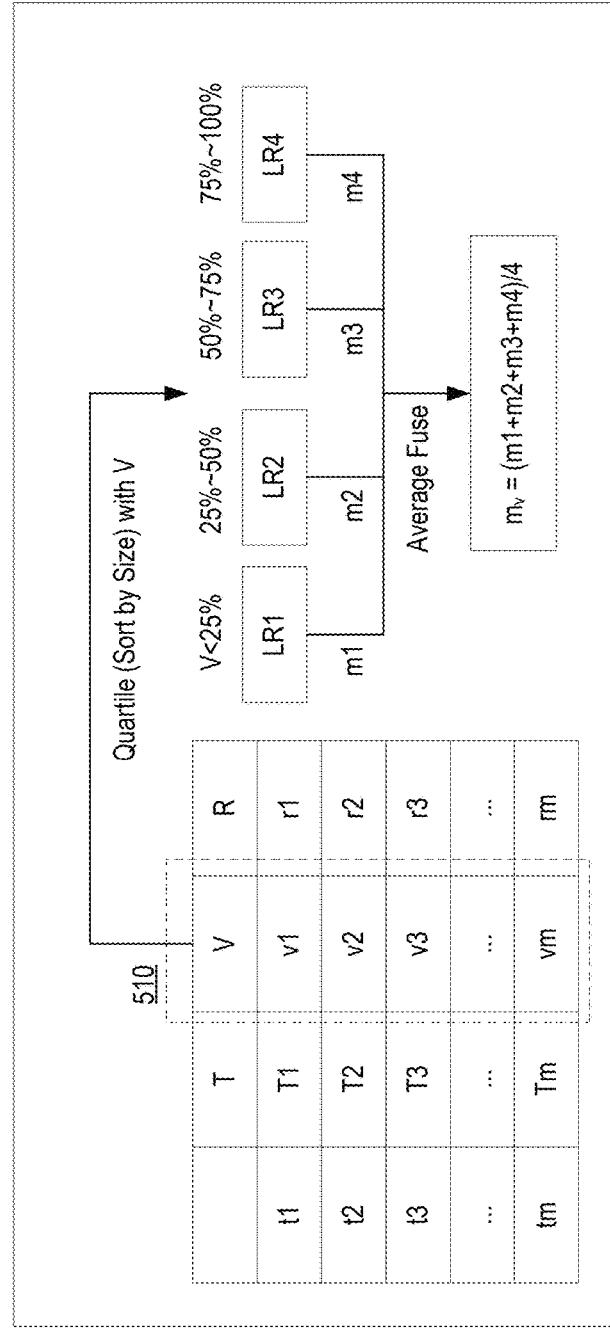

ESTIMATING MOVING VEHICLE WEIGHT BASED ON DRIVING DATA

BACKGROUND

The present application relates generally to an improved data processing apparatus and method and more specifically to an improved computing tool and improved computing tool operations/functionality for automatically estimating a moving vehicle's weight based on driving data with a low sampling rate.

Vehicle real-time load weight data is important data to have during a vehicle life cycle, as this data often affects vehicle driving state, safe driving conditions, fault diagnosis, life cycle management and other considerations regarding the operation of a vehicle over time. This load weight data may be used by various on-board and off-board computing systems to make decisions and evaluations regarding the vehicle.

In some cases, vehicle real-time load weight data is used as part of law enforcement with regard to transportation of goods, both in cases of legal and illegal transportation of goods. That is, vehicle real-time load weight data may be used to determine whether a vehicle is transporting excessive loads leading to the potential for serious cargo damage, whether transportation laws are being violated, whether there is private use of public vehicles, and the like.

In some cases, the vehicle real-time load weight data may be used to detect the condition of vehicles when being sold. In such cases, the load weight data may be used to determine whether vehicles have been and are being operated with the scope of insurance requirements, maintenance requirements, and the like, before engaging in the sale of the vehicle.

Existing vehicle load identification mechanisms rely on specific load identification hardware devices that are physically installed in the vehicle itself, which identify and store the measured vehicle load. These load identification hardware devices often require various specific hardware sensors, such as gyroscopes, accelerometers, tire pressure gauges, and other auxiliary tools in order to operate properly. These hardware devices are costly and the scope of the hardware operations is limited due to the need for special sensors providing specialized data that is of little use beyond the vehicle load identification domain. In addition, these hardware devices require special installation and continued maintenance, leading to additional costs. For hardware devices that report their measurements remotely, transmission costs are also an issue. Moreover, once the hardware device fails, it will send back incorrect load weight data which may be difficult to distinguish from valid weight data.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method for automatically predicting vehicle weight of a moving vehicle is provided. The method comprises obtaining vehicle operation data from one or more on-board sensors or on-board computing systems of the vehicle and extracting one or more features from the vehicle operation data. The method further comprises filtering the one or more features based on a required working condition of the vehicle to identify intervals of features having valid feature data to thereby generate a filtered valid data. The method also comprises processing, by a first artificial intelligence (AI) computer model, the filtered valid data based on time slices of the filtered valid data to generate a first prediction of vehicle weight, and processing, by a second AI computer model, the filtered valid data based on buckets of key variables in the filtered valid data to generate a second prediction of vehicle weight. In addition, the method comprises fusing the first prediction with the second prediction to generate a final prediction of vehicle weight, and outputting the final prediction of vehicle weight to downstream computing logic.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram of a table of vehicle operating data for various time points in accordance with one illustrative embodiment;

FIG. 5 is an example diagram illustrating operation of a bucket computer model in accordance with one illustrative embodiment;

DETAILED DESCRIPTION

Figure 1:
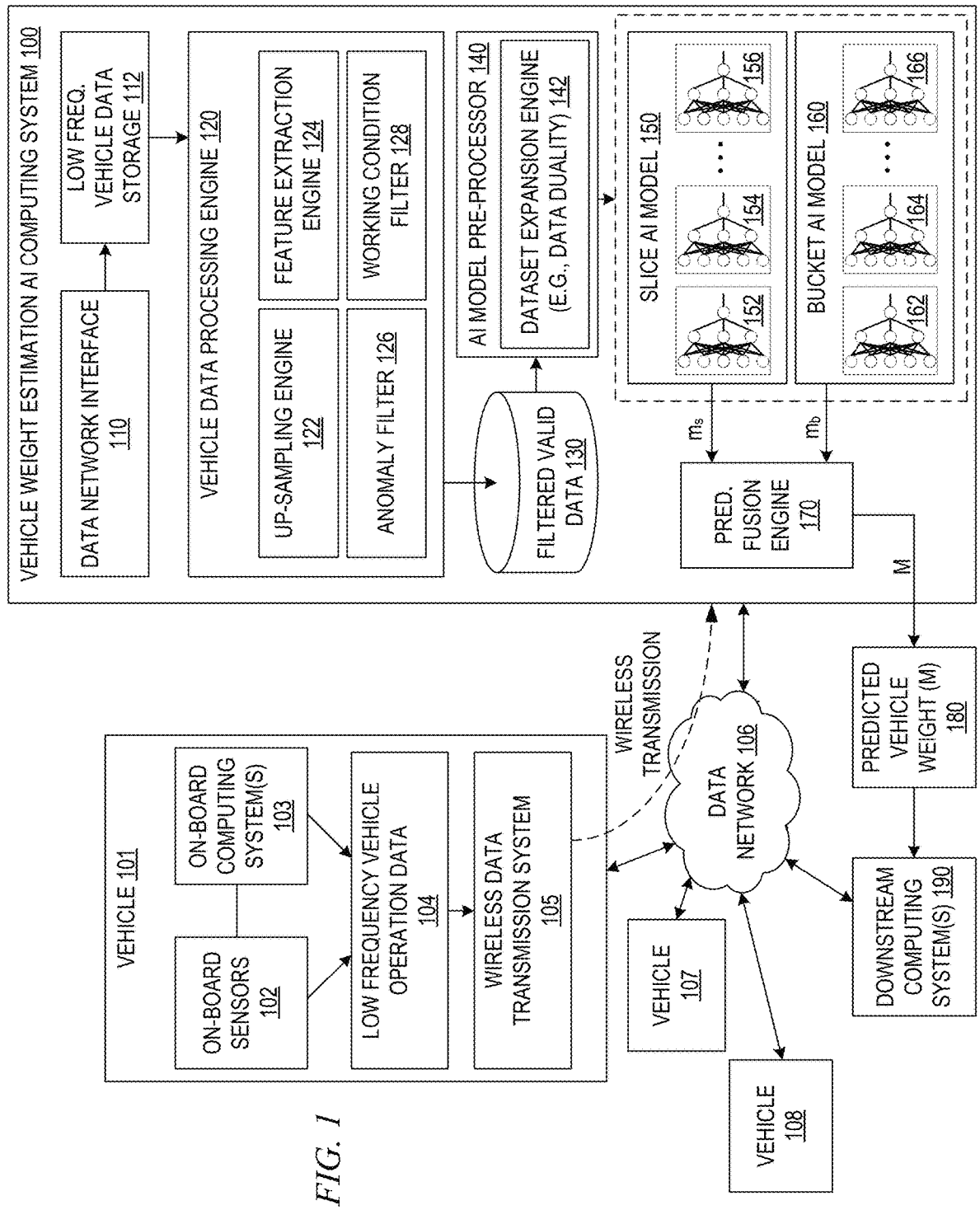
FIG. 1 is an example block diagram of the primary operational components of a vehicle weight estimation artificial intelligence computing system in accordance with one illustrative embodiment.

The illustrative embodiments provide an improved computing tool an improved computing tool functionality/operations that implements artificial intelligence based prediction of vehicle load weight without requiring specialized hardware devices or specialized sensors. The illustrative embodiments predict the load weight based on the dynamic information of the vehicle using existing vehicle operational data. The illustrative embodiments avoid the need to install additional hardware devices in the vehicle and provide a low frequency data collection based mechanism which greatly reduces operation costs of the vehicle and of an organization operating a fleet of such vehicles.

It should be appreciated that while the illustrative embodiments and examples set forth in the following detailed description will assume that the vehicle is a land-based large size transportation vehicle, e.g., a cargo hauling truck, the illustrative embodiments are not limited to such and may in fact be implemented with any land, sea, air, or even space vehicles. Thus, for example, the vehicle weight estimation computing tool and computing tool functionality of the illustrative embodiments may be implemented with cargo ships, cargo hauling trains, passenger and cargo hauling aircraft, or the like. Moreover, the illustrative embodiments may be implemented with regard to smaller size vehicles, such as personal vehicles, delivery vans/trucks, and the like. Thus, the illustrative embodiments should not be considered to be limited to any particular type of vehicle.

It should also be appreciated that the term "load weight" refers to the total weight (or mass) of a vehicle, including the weight of the vehicle itself, the weight of passengers, the weight of cargo (goods), etc. For purposes of the present description, and for ease of explanation, the terms "load weight" and "weight" will be used interchangeably hereafter.

As noted above, vehicle real-time weight data is important data to have for various purposes including for use in active control of the vehicle, reporting for ensuring that the vehicle is being operated in compliance with policies, rules, and laws, scheduling and performing vehicle maintenance, vehicle health analysis and life cycle management, and the like. The evaluated weight can be used in various of scenarios, such as using the vehicle real-time weight data to judge whether the vehicle is overloaded or not, determining whether the driver's driving behavior is in compliance with policies, rules, laws, insurance requirements, maintenance requirements, a given contract, or the like. For example, with some vehicle maintenance contracts, the vehicle is required to operate with real-time weights that are below a specified vehicle load threshold. If the weight exceeds that vehicle load threshold value, the automobile company or insurance company may have the right to terminate that maintenance contract or reduce insurance interests/coverage of the vehicle. In this scenario, the continuously monitored vehicle weight can provide evidence that the driving behavior of the operator of the vehicle is in compliance, or is out of compliance, with the specified vehicle load requirements.

As another example, if a company or a person owning a fleet of vehicles requires that the operator of the vehicle deliver a certain weight of goods to the buyer, then a load of cargo/goods with insufficient weight may not be accepted or permitted to be transported. In some cases, if the vehicle weight is above the specified weight of goods by a threshold amount, this may be indicative of the vehicle being used for multiple purposes, i.e., a load that is not the particular goods contracted for transportation. That is the vehicle may be being used for private transportation purposes, which may not be allowed by the contracting party who has contracted for shipment of the certain weight of goods. In some cases, excess weight may also be indicative of the vehicle being used for illegal transportation of goods, or even in recent years, persons, in contradiction of established policies, rules, or laws. Being able to monitor vehicle weight in real-time can assist in determining if a vehicle is being operated in violation of such policies, rules, laws, or contractual requirements.

The illustrative embodiments provide an improved computing tool and improved computing tool functionality that automatically estimates vehicle weight dynamically, e.g., as the vehicle is in operation, based on driving data with a low sampling rate. For example, the improved computing tool and improved computing tool functionality may be provided in a computing system remote from the vehicle itself, and is not installed on the vehicle. As such, real-time driving data of the vehicle is reported to the remote computing system via wireless data transmissions. To reduce the amount of data that needs to be transmitted, low frequency driving data is measured and collected using existing vehicle sensors and on-board computing systems and reported through wireless transmission to the remote computing device. By low frequency data, what is meant is that the data is collected at relatively sparse time points such that the amount of data is minimized but sufficient for up-sampling. That is, rather than collecting a large volume of vehicle operation data and having to transmit this large volume of data, a more sparse set of vehicle operation data is collected and then up-sampling is implemented to generate sufficient data for use in vehicle weight estimation/predictions. As would be understood by one of ordinary skill in the art, it would likely be difficult (if not impossible) to establish thresholds of what is low frequency that would hold across every set of data for every organization. As such, in executing this aspect of the disclosure, the threshold at which something would be "low frequency" would be highly fact-specific to the given situation. However, one of ordinary skill in the art, in view of the present description, can determine for their own implementation what a sufficiently low frequency of data collection is relative to other frequencies of data collection, whatever threshold they choose to set for "low frequency" for the particular implementation, and those of ordinary skill in the art understand that any determination of a frequency being a "low frequency" would be encompassed by the scope of the present invention.

The improved computing tool and improved computing tool functionality may obtain this low frequency driving data, such as velocity of the vehicle, engine revolutions per minute (rpm), actual torque, brake and clutch status, throttle status, transmission ratio, and the like, and perform operations to process the low frequency data to generate data useable for vehicle weight estimation/prediction. It should be appreciated that this low frequency driving data is data that is already monitored and collected by existing on-board systems of the vehicle, such that no additional hardware needs to be installed in the vehicle to collect and report such data to the remote computing system. This low frequency driving data may be obtained from any existing vehicle monitoring system, vehicle of things (VoT) platform, or other similar platforms or systems already present in the vehicle itself which sense/monitor such information and report such information for other purposes different from vehicle weight estimations.

The use of low frequency driving data, also referred to as basic vehicle data, reduces data transmission costs as the amount of data and the frequency at which this data is reported are relatively low compared to high frequency data. However, low frequency raw data cannot be effectively modeled as there is an insufficient amount of data to perform accurate linear regression or machine learning operations. Thus, the illustrative embodiments may perform up-sampling to convert the received low-frequency raw data from the vehicle to high-frequency data to support subsequent modeling of the vehicle weight. An interpolation method may be used to perform such up-sampling. Based on vehicle dynamics and known relationships, such as from physics, fluid dynamics, and the like, various features suitable for vehicle modeling may be extracted from the up-sampled raw vehicle data, e.g., traction force, acceleration, delta-force, delta-acceleration, etc. For example, from basic physics, it is known that acceleration may be determined as the derivative of velocity such that if the raw vehicle data has velocity measurements, then the acceleration of the vehicle may be derived.

The extracted features may be filtered based on working condition filters and anomaly data filters. Working condition filters operate to filter out data that corresponds to the vehicle conditions that cannot be used for vehicle weight prediction, e.g., conditions of the brake or clutch. For example, in one illustrative embodiment, the low frequency data or corresponding extracted features that correspond to times when the following five conditions occur simultaneously indicate a normal working condition of the vehicle and thus, the corresponding data may be utilized: (1) brake status=0 (no brake); (2) clutch status=0 (no clutch); (3) velocity>3 km/h; (4) engine rpm (Revs)>750 rpm; and (5) gear in [5, 6, 7, 8]. If all five conditions are not met, then the corresponding low frequency data or extracted features may be filtered out of the useable dataset in this example illustrative embodiment. It should be appreciated that this is only an example and other criteria for identifying usable working conditions of the vehicle may be used without departing from the spirit and scope of the present invention, and may be different based on the particular type of vehicle involved. The values indicated, and the particular systems evaluated, e.g., brake system, clutch, engine, etc., may differ from one implementation to another, with the concept being a filter that identifies data related to weight prediction usable working conditions of the vehicle and data that corresponds to working conditions of the vehicle whose data cannot be reliably used to predict vehicle weight.

With regard to anomaly data filters, for example, in some illustrative embodiments, an Elliptic envelope based filter may be used to identify data within a specified ellipse, which is considered normal data, and data outside the specified ellipse, which is considered anomaly data. Such mechanisms assume a Gaussian distribution of the data. Elliptic envelope algorithms are known machine learning algorithms and thus, a more detailed explanation is not provided herein. The anomaly data filter may be applied before, after, or at substantially a same time as the working condition filter, so as to generate a filtered dataset of either low frequency raw data upon which feature extraction is performed, or upon the already extracted features. In either case, a filtered feature dataset is generated as a result.

The filtered feature dataset may be pre-processed prior to input to the AI computer models of the illustrative embodiments in order to minimize the error of machine learning processes, e.g., linear regression, by expanding the filtered feature dataset. In some illustrative embodiments, this filtered feature dataset pre-processing may be performed using a data duality approach. While a data duality approach may be described as one illustrative embodiment, it should be appreciated that other dataset expansion techniques may also be utilized without departing from the spirit and scope of the present invention. The expansion of the filtered feature dataset serves to minimize the influence of anomalous data points in the filtered feature dataset on the machine learning processes. For example, with regard to a linear regression based machine learning process, the dataset expansion reduces the influence of anomalous data on the intercept of the linear regression, thereby reducing error.

Thus, for example, in some illustrative embodiments, the filtered feature dataset may be expanded, prior to input to artificial intelligence (AI) computer models, or as part of a pre-processing operation within the AI computer models, to implement a data duality approach to minimize errors, due to anomalous data in the filtered feature dataset, in the resulting linear regression operation performed by the LR model(s) of the slice model and bucket model, as discussed hereafter. With the data duality approach, the data samples in the filtered feature dataset, referred to as the old data samples, serve as the basis for generating a new dataset comprising the data samples with opposite sign. That is, for example, if a sampled data point in the old data samples (filtered feature dataset) is represented as (x, y), then the new data point in the new dataset would be (−x, −y). Each data sample in the old dataset will have a corresponding, but opposite sign, data sample in the new dataset. The combination of the old dataset and the new dataset may then be used to perform the linear regression operations of the LR model(s). By introducing these additional data samples into the combined, or data duality, dataset, the intercept of the linear regression is moved closer to the origin and thereby, the error is reduced in the resulting linear regression.

For example, assume that there are 10 sample points in the input (old) dataset, where 8 of these sample points belong to non-anomalous data, and the other 2 points belong to anomalous data. If linear regression is performed based on these 10 sample points, the 2 anomalous sample points will affect the result of linear regression, thus producing a large intercept (error). However, if data duality is utilized, 10 new sample points are obtained, each new sample point corresponding to an old sample point, except that their X and Y values are of opposite signs from the old sample point. Performing linear regression based on all 20 sample points (10 old sample points and 10 new sample points), it can be found that the negative impact of anomalous data on linear regression is reduced (the intercept becomes smaller, which means that the error is reduced). In short, from this example, it can be seen that data duality can reduce the negative impact of anomalous data on linear regression to a certain extent, reduce errors, and make the model more stable.

The pre-processed filtered feature dataset may be input to the AI computer models of the illustrative embodiments for use in performing vehicle weight prediction operations as described hereafter. These AI computer models may comprise a slice computer model and a bucket computer model. The slice computer model operates on time slices of input data whereas the bucket computer model operates on parameter (input feature) intervals. These models may in turn comprise one or more linear regression (LR) models which separately process the pre-processed filtered feature data, e.g., the data duality dataset, and generate estimates or predictions of vehicle weight. The two models are utilized because in some time intervals, the operation of the vehicle may be more, or less, similar to a theoretical vehicle dynamics model, as will be discussed hereafter. That is, in some time intervals the operation of the vehicle, as represented by the extracted features, due to the influence of various real factors, may not closely resemble the theoretical vehicle dynamics model and thus, in this case, the prediction values of the slice model may be more accurate (which is based on time intervals). Under other conditions, e.g., particular speed intervals, or other operational condition intervals, the relationship between the operation of the vehicle and the theoretical vehicle dynamics model may be closer, in which case the bucket computer model may be more accurate because the bucket model is based on parameter (or extracted feature) intervals.

A weighted fusion of these estimates/predictions may be performed to generate a final predicted value for the vehicle weight (load weight). The final predicted vehicle weight may then be further processed to perform various operations that are based on the vehicle weight. For example, operations may be performed based on the final predicted vehicle weight to determine compliance with one or more predefined policies, rules, laws, or contractual requirements. Violations of compliance may be identified and reported, such as by outputting an electronic alert to appropriate authorized personnel via their corresponding computing devices.

For example, a transportation company operating one or more vehicles may specify clear upper limitations on the weight that their vehicles can carry. If the predicted weight of the vehicle generated by the mechanisms of the illustrative embodiments is larger than this upper limit, this indicates that the vehicle is overloaded and violates the company policy, and most likely traffic regulations as they typically drive company policies. This can be done dynamically while the vehicle is operating, such that if the vehicle picks up a load of cargo along its route, this overload condition can be detected and reported. Thus, the illustrative embodiments can assist transportation companies, law enforcement, and the like, in determining real-time weight of vehicles and identify vehicles that are operating outside safe conditions. Similarly, vehicle insurance companies also have clear regulations on the weight limit of vehicles. The illustrative embodiments may be used to determine the vehicle weight to ensure that the vehicle is being operated in compliance with the vehicle owner's insurance policy requirements and is not overloaded which may lead to greater risk of an accident or greater damages should an accident occur, and for which the insurance company may not compensate the vehicle owner due to a violation of the insurance policy terms.

Thus, the illustrative embodiments provide an improved computing tool and improved computing tool functionality that operates to predict vehicle weight without requiring specific additional hardware installed in the vehicle for measuring vehicle weight. To the contrary, the illustrative embodiments utilize low frequency data that is already collected by on-board sensors and computing systems of the vehicle, and which is reported remotely to a remotely located computing system, e.g., one or more server computing devices, which uses this low frequency data to predict the vehicle's weight while the vehicle is in operation, e.g., a moving vehicle. The illustrative embodiments utilize data filters, up-sampling, pre-processing to reduce sources of error in machine learning processes, AI computer models, and prediction fusion logic to automatically predict, based on machine learning and AI processes, the weight of the vehicle. These predictions may then be provided to other downstream computing systems for performance of their operations which are based on vehicle weight. The illustrative embodiments therefore, eliminate the various costs associated with requiring specialized vehicle weight hardware installed on the vehicle, including installation costs, operating costs, maintenance costs, and the costs associated with failure of such hardware devices.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

With reference now to the figures, FIG. 1 is an example block diagram illustrating the primary operational components of a vehicle weight estimation artificial intelligence (AI) computing system in accordance with one illustrative embodiment. The operational components shown in FIG. 1 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests to estimate vehicle weight, and the resulting output may aid human beings, e.g., ensuring compliance with policies, rules, laws, or contractual requirements. The invention is specifically directed to the automatically operating computer components directed to improving the way that vehicle weight determinations are performed, and providing a specific solution that implements artificial intelligence based predictions based on low frequency raw vehicle operational data, which cannot be practically performed by human beings as a mental process and is not directed to organizing any human activity.

As shown in FIG. 1, the vehicle weight estimating AI computing system 100 comprises a data network interface 110, a low frequency vehicle data storage system 112, a vehicle data processing engine 120, an AI model preprocessor 140, a slice AI model 150, bucket AI model 160, and a prediction fusion engine 170. The vehicle weight estimation AI computing system 100 may be provided on one or more computing devices that are remotely located from the actual vehicles 101, 107, 108 for which vehicle weight predictions may be generated. The vehicle weight estimation AI computing system 100 may obtain low frequency vehicle data from these various vehicles 101, 107, 108 via one or more data networks 106, preferably through wireless transmission from the vehicles to one or more data network 106 infrastructure components, which may thereafter transmit the data via one or more communication links of the data network(s) 106, which may be wired, wireless, or any combination of wired and wireless communication links. For purposes of the present depiction, the components of only one of the vehicle computing systems for vehicle 101 is shown, but it should be appreciated that the other vehicles 107 and 108 may include similar components for collecting and transmitting vehicle operational data.

The vehicle 101 comprises on-board sensors 102, one or more on-board computing systems 103, a low frequency vehicle operation data storage 104, and a wireless data transmission system 105. The on-board sensors 102 sense operational conditions of the vehicle 101 which are represented as low frequency vehicle operation data which is provided to the on-board computing system(s) 103 and stored in the storage 104. This low frequency vehicle operation data may comprise various type of data representative of the current driving and operational conditions of the vehicle 101 including, but not limited to, velocity of the vehicle, engine revolutions per minute (rpm), actual torque, brake and clutch status, throttle status, transmission ratio, and the like. The stored low frequency vehicle operation data in the storage 104 may be transmitted via the wireless data transmission system 105 to the remotely located vehicle weight estimation AI computing system 100 via one or more data networks 106.

It should be appreciated that this low frequency driving data is data that is already monitored and collected by existing on-board systems of the vehicle, including the on-board sensors 102, on-board computing systems 103, storage 104, and wireless data transmission system 105. Thus, no additional hardware needs to be installed in the vehicle 101 to collect and report such data to the remote computing system. To the contrary, this low frequency driving and operation data is obtained from existing vehicle monitoring systems, sensors, vehicle of things (VoT) platforms, and the like already present in the vehicle itself which sense/monitor such information and report such information for other purposes different from vehicle weight estimations. For example, these on-board systems may collect such data to drive computations for controlling subsystems of the vehicle, e.g., braking systems, traction control systems, collision avoidance systems, and the like, and reporting of such data may be performed to monitor health of the vehicle 101, schedule maintenance, and the Ike. Thus, the collection, storage, and transmission of the low frequency vehicle operation data is facilitated by existing vehicle systems.

The low frequency vehicle operation data is received by the vehicle weight estimation AI computing system 100 via the data network interface 110 and stored in a low frequency vehicle data storage 112 in association with a vehicle identifier that uniquely identifies the vehicle, e.g., a unique identifier such as the vehicle identification number (VIN) or other unique identifier. The bw frequency vehicle operation data in the storage 112 may be input to the vehicle data processing engine 120 which operates on the data to generate a filtered valid dataset 130 for the vehicle 101 that can be pre-processed by the AI model pre-processor 140 into a dataset that the AI computer models 150, 160 operate on to generate vehicle weight predictions. The vehicle data processing engine 120 comprises an up-sampling engine 122, a feature extraction engine 124, an anomaly filter 126, and a working condition filter 128.

As noted above, the use of low frequency driving data, or basic vehicle data, reduces data transmission costs as the amount of data and the frequency at which this data is reported are relatively low compared to high frequency data. The vehicle data processing engine 120 may invoke the up-sampling engine 122 to perform up-sampling of the low frequency vehicle operation data to thereby generate higher frequency vehicle data. For example, this up-sampling may comprise interpolating additional data points from those collected to thereby produce an approximation of a sequence of data points that would have been obtained by sampling the data at a higher rate or frequency. It should be appreciated that in some illustrative embodiments, where the volume of collected and transmitted vehicle operation data is not of a concern, the vehicle on-board systems 102-105 may collect and transmit the higher frequency vehicle operation data such that up-sampling is not necessary. However, as data transmission costs are of a concern, it is assumed that for most implementations, low frequency vehicle operation data and up-sampling will be the preferred implementation, but not required.

Thus, the illustrative embodiments may perform up-sampling to convert the received low-frequency vehicle operation data in storage 112, obtained from the vehicle 101 on-board systems 102-105, to higher frequency data to support subsequent modeling of the vehicle weight estimates/predictions. An interpolation method may be used to perform such up-sampling. Thus, a larger amount of data is provided for feature extraction.

The up-sampled vehicle operation data from the up-sampling engine 122 may be provided to the feature extraction engine 124. The feature extraction engine 124, based on vehicle dynamics and known relationships, such as from physics, fluid dynamics, and the like, various features suitable for vehicle modeling may be extracted from the up-sampled raw vehicle data, e.g., traction force, acceleration, delta-force, delta-acceleration, etc. The features extracted are those necessary for solving one or more vehicle dynamic equations for the mass, or weight, of the vehicle. In some illustrative embodiments, these features are used to populate variables of a longitudinal force balance equation of the vehicle, referred to herein as the vehicle dynamic equation.

To better understand the vehicle dynamic equation, consider that when the vehicle is running, there are many resistances from different directions. Assuming that the vehicle is a land vehicle, such as a truck or automobile, if the vehicle wants to maintain constant speed while driving, it must overcome the rolling resistance ($F_f$) from the ground and the aerodynamic resistance ($F_w$) from the air. And extra effort is needed to overcome acceleration resistance ($F_j$) and uphill resistance ($F_i$) during acceleration or climbing. Thus, the sum of the resistances while the vehicle is driving can be computed as following:

$$\sum F = F_f + F_w + F_i + F_j \qquad (1)$$

And if the vehicle keeps constant speed while driving, it needs to overcome this resistance above, therefore, the driving force computation may be performed as:

$$F_t = \Sigma F \qquad (2)$$

In addition, if the vehicle is to be accelerating, it should have the driving force greater than the resistance.

In equation (1), each resistance has its own equation. For example, for the rolling resistance ($F_f$), the equation is:

$$F_f = mgf \qquad (3)$$

Here, m is mass, g is gravity, and f is Rolling Resistance Coefficient of Tires, which can be found in the parameters of manufacture information for the tires, vehicle user guides, or the like.

For the other resistances, the relationships are as follows. For the aerodynamic resistance ($F_w$) from the air, the relationship is:

$$F_w = \frac{1}{2} C_D A \rho v^2 \quad (4)$$

Here, $C_D$ is Air Resistance Coefficient, A is the Frontal Area of the vehicle, $\rho$ is Air Density, and v is vehicle speed (or velocity). For the acceleration resistance ($F_j$) the relationship is:

$$F_i = mgi \quad (5)$$

Here, i is a sine value of a road grade angle, which can be computed based on an acceleration sensor signal, e.g., $(i=(a_{sen}-a_v)/g$, where $a_{sen}$ is the signal from acceleration sensor and ay is the vehicle acceleration while driving. For the uphill resistance ($F_i$), the relationship is:

$$F_j = \delta m a_v \quad (6)$$

Here, $\delta$ is a Conversion Coefficient of Rotational Mass, which can be computed as:

$$\delta = 1 + \frac{1}{m} \frac{I_w}{r^2} + \frac{1}{m} \frac{I_f i_0^2 i_g^2 \eta}{r^2} \quad (7)$$

Here, $I_f$ is the moment of inertia of the wheel, r is the wheel radius, $i_0$ is main reducer transmission ratio, $i_g$ is transmission ratio, $\eta$ is vehicle transmission efficiency, and the quantity $$i_0 i_g = 0.377 \frac{rn}{v},$$

where n is torque. For the driving force $F_t$, the relationship is:

$$F_t = \frac{T_{tq} i_0 i_g \eta}{r} \quad (8)$$

Here, $T_{tq}$ is engine driving moment.

From the above equations, it can be seen that some of them contain the mass (m) or weight of the vehicle. Thus, these relationships can be used to estimate or predict the vehicle weight or mass if the other quantities of the relationship are known or estimated. Thus, by performing feature extraction on the vehicle operational data, these quantities may be obtained or estimated and used to predict vehicle weight (or mass).

For example, if one replaces the vehicle dynamics equation $F_t = F_f + F_w + F_i + F_j$ with the above relationships, one obtains $$\eta \frac{T_{tq} nt}{v} = mgf + \frac{1}{2} C_D A \rho v^2 + mgi + ma_v + \frac{I_w}{r^2} a_v + a_v I_f \eta \left(\frac{nt}{v}\right)^2.$$

If one takes the derivative of this equation and combines similar terms, one obtains the formula:

$$\Delta T_{tq} \frac{n}{v} = A * \Delta a_v m \quad (9)$$

Here, one may represent $$\Delta T_{tq} \frac{n}{v}$$

as Y and $A*\Delta a_v$ as X, such that equation (9) is a linear function Y=m*X. Therefore, one can calculate a set of (X, Y) points from the filtered valid dataset and a known constant. If these points are grouped into groups of (X, Y) points that fit a linear regression (LR) model, then the slope of the line is the estimated/predicted mass (m), or weight, of the vehicle, where again this is the load weight of the vehicle as defined previously. The slice AI model 150 and bucket AI model 160 may implement linear regression machine learning computer models that perform such predictions/estimates of mass or weight using these principles.

It should be appreciated that while the above equations are for land based vehicles with wheels, the illustrative embodiments are not limited to such, and similar dynamics equations may be used for other types of vehicles, e.g., other land, water, air, or space vehicles. While the dynamics themselves may differ, the equations and relationships are present for the various types of vehicles, which may operate based on different features than those set forth above, but which are generally known relationships. Hence, different implementations of the vehicle weight estimation AI computing system 100 may be provided for different types of vehicles.

Thus, with this in mind, the feature extraction engine 124 takes the up-sampled vehicle operating data and extracts features from the up-sampled data, where these features are ones that can provide information regarding the variables in the vehicle dynamics equation(s), for example. The extracted features may then be filtered by the anomaly filter 126 and working condition filter 128 so as to generate a filtered valid dataset 130. These filters 126, 128 operate based on the understanding that not all data can be used for modeling a vehicle driving process. For example, when braking, when engaging the clutch, or when idling, the collected data does not meet the vehicle dynamics equation, therefore it is necessary to use the working conditions to screen out the invalid data from the valid data. The working condition filter 128 operates to filter out data based on working conditions. The anomaly filter 126 operates to filter out data points that are considered to be anomalous, e.g., outside a region defined as representing normal vehicle operating data, such as by using an Elliptic envelope or the like.

That is, the working condition filter 128, which will be described in greater detail hereafter, operates to filter out data that corresponds to the vehicle conditions that cannot be used for vehicle weight prediction, e.g., conditions of the brake or clutch. For example, the working condition filter 128 may filter out feature data that corresponds to conditions of the vehicle where predetermined conditions are present. As noted above, in one illustrative embodiment in which the vehicle is a transportation truck, the conditions are (1) brake status=0 (no brake); (2) clutch status=0 (no clutch); (3) velocity>3 km/h; (4) engine rpm (Revs)>750 rpm; and (5)

gear in [5, 6, 7, 8]. If all five conditions are not met, then the corresponding low frequency data or extracted features may be filtered out of the useable dataset when generating the filtered valid data 130, i.e., data corresponding to periods of operation of the vehicle where these 5 conditions are not satisfied is considered to be invalid data.

With regard to the anomaly data filter 126, for example, in some illustrative embodiments, an Elliptic envelope based filter may be used to identify data within a specified ellipse, which is considered normal data, and data outside the specified ellipse, which is considered anomaly data. The anomaly data filter 126 may be applied before, after, or at substantially a same time as the working condition filter 126, so as to generate a filtered up-sampled vehicle operation dataset upon which feature extraction is performed by the feature extraction engine 124, or may be applied upon the already extracted features from the feature extraction engine 124. In either case, a filtered valid dataset 130 is generated as a result, where this filtered valid dataset comprises feature data that has been determined to not be clearly anomalous and which corresponds to normal driving conditions of the vehicle that meet the condition requirements of the working condition filter 128.

The filtered valid dataset 130 may be pre-processed by the AI model pre-processor 140 prior to input to the AI computer models 150, 160 in order to minimize the error of machine learning processes, e.g., linear regression, by expanding the filtered valid dataset 130. In some illustrative embodiments, this filtered valid dataset 130 may be pre-processed by the pre-processor 140 using a dataset expansion engine 142. The dataset expansion engine 142 may implement a data duality approach, as previously discussed above, or other dataset expansion techniques, to expand the filtered valid dataset 130 so as to reduce any influence of anomalous data samples that may still remain in the filtered valid dataset 130. Thus, in some illustrative embodiments, the filtered feature dataset may be expanded prior to input to artificial intelligence (AI) computer models 150, 160, or as part of a pre-processing operation within the AI computer models 150, 160, to implement a data duality approach to minimize errors. With the data duality approach, the data samples in the filtered valid dataset 130 (old data samples) serve as the basis for generating a new dataset comprising the data samples with opposite sign, such that each data sample in the filtered valid dataset 130 will have a corresponding, but opposite sign, data sample in the new dataset which is combined with the old samples in the filtered valid dataset 130 to generate an expanded dataset that is input to the AI computer models 150, 160.

These AI computer models 150, 160, in the depicted example, comprise a slice computer model 150 and a bucket computer model 160. The slice computer model 150 operates on time slices of input data whereas the bucket computer model 160 operates on parameter (input feature) intervals. These models may in turn comprise one or more machine learning computer models 152-156 and 162-166, respectively, which in some illustrative embodiments may be implemented as linear regression (LR) models 152-156 and 162-166, that separately process the pre-processed filtered valid data, e.g., the data duality dataset generated by the AI model pre-processor 140, and generate estimates or predictions of vehicle weight based on the vehicle dynamics equation(s). As noted previously, the two models 150, 160 are utilized because in some time intervals, the operation of the vehicle may be more, or less, similar to the theoretical vehicle dynamics model comprising the vehicle dynamics equation(s). That is, in some time intervals the operation of the vehicle, as represented by the extracted features, due to the influence of various real factors, may not closely resemble the theoretical vehicle dynamics model and thus, in this case, the prediction values of the slice model may be more accurate (which is based on time intervals). Under other conditions, e.g., particular speed intervals, or other operational condition intervals, the relationship between the operation of the vehicle and the theoretical vehicle dynamics model may be closer, in which case the bucket computer model may be more accurate because the bucket model is based on parameter (or extracted feature) intervals.

The machine learning computer models 152-156 each process the data duality dataset generated by the AI model pre-processor 140 and output a prediction of a vehicle weight (or mass), e.g., model 152 outputs mass prediction $m_{s1}$, model 154 outputs mass prediction $m_{s2}$, and model 156 outputs mass prediction msn. The outputs of each of these models 152-156 may be combined by an output layer of the slice model 150 to generate a single output prediction $m_s$ of the mass of the vehicle. Similarly, machine learning computer models 162-166 each process the data duality dataset generated by the AI model pre-processor 140 and output a prediction of a vehicle weight (or mass), e.g., model 162 outputs mass prediction $m_{b1}$, model 164 outputs mass prediction $m_{b2}$, and model 166 outputs mass prediction $m_{bn}$. The outputs of each of these models 162-166 may be combined by an output layer of the bucket model 160 to generate as ingle output prediction $m_b$ of the mass of the vehicle.

A weighted fusion of these estimates/predictions $m_s$ and $m_b$ may be performed by the prediction fusion engine 170 to generate a final predicted value M for the vehicle weight (load weight). The weights applied to the estimates/predictions may be learned over time using machine learning and reinforcement learning approaches. In some illustrative embodiments, the weights are based on the relative number of machine learning computer models 152-156 and 162-166 in the slice AI model 160 and bucket AI model 160, respectively. That is, there may be different numbers of s machine learning computer models 152-156 and 162-166 depending on the number of time slice intervals processed and the number of buckets processed, as discussed hereafter. Thus, based on a relative measure of the numbers of these computer models, e.g., a ratio of the models 152-156 and 162-166, the outputs of the slice AI model 150 and bucket AI model 160 may be weighted.

The final predicted vehicle weight M may then be provided to other downstream computing systems 190 or algorithms for further processed to perform various operations that are based on the vehicle weight M. For example, operations may be performed based on the final predicted vehicle weight M to determine compliance with one or more predefined policies, rules, laws, or contractual requirements. Violations of compliance may be identified and reported by the downstream computing system(s) 190, such as by outputting an electronic alert to appropriate authorized personnel via their corresponding computing devices. For example, in some cases, an alert or notification may be pushed by the downstream computing system(s) 190 to the vehicle 101 for output on a display in the vehicle 101 (not shown) which indicates a violation of operating requirements of the vehicle, e.g., a policy, rule, law, or contractual requirement violation. Similarly, such an alert/notification may be sent to a provider/operator of the vehicle fleet at another computing device (not shown) connected to the data network 106.

It should be appreciated that while FIG. 1 shows the downstream computing system(s) 190 being separate from the vehicle weight estimation AI computing system 100, such separation is not required. To the contrary, the logic and computer functionality of the vehicle weight estimation AI computing system 100 may be integrated in or part of the logic of the downstream computing system(s) 190 or vice versa. Thus, in some illustrative embodiments, the further analysis and operations of the downstream computing system(s) 190 may be performed by logic within the vehicle weight estimation AI computing system 100.

It should be appreciated that the illustrative embodiments clearly provide significant cost savings with regard to mechanisms for identifying vehicle weight, especially with regard to fleets of vehicles. That is, the vehicles 101, 107, and 108, which may represent a small fleet of vehicles, are not modified for the present invention to operate. No new hardware, or dedicated hardware, need be installed in the vehicles 101, 107, and 108 in order to determine vehicle weight. To the contrary, the illustrative embodiments use the data already collected and reported by systems already present in the vehicles 101, 107, and 108. This avoids costs for installation, operation, and maintenance of hardware on the vehicles themselves. This also saves the resource costs of specially trained personnel that can install and maintain such hardware on the vehicles, as such specialized vehicle weight measuring hardware are not required. Moreover, the illustrative embodiments avoid problems of such specialized vehicle weight measuring hardware failing and reporting erroneous data.

In addition, it should be appreciated that the same instance of vehicle weight estimation AI computing system 100 may operate to service multiple different vehicles 101, 107, and 108. Thus, there is a one to many savings in that a single instance of AI computing system 100 may operate to perform vehicle weight estimations/predictions for a plurality of different vehicles of the same or different fleets and the same or different vehicle providers/operators.

Figure 2:
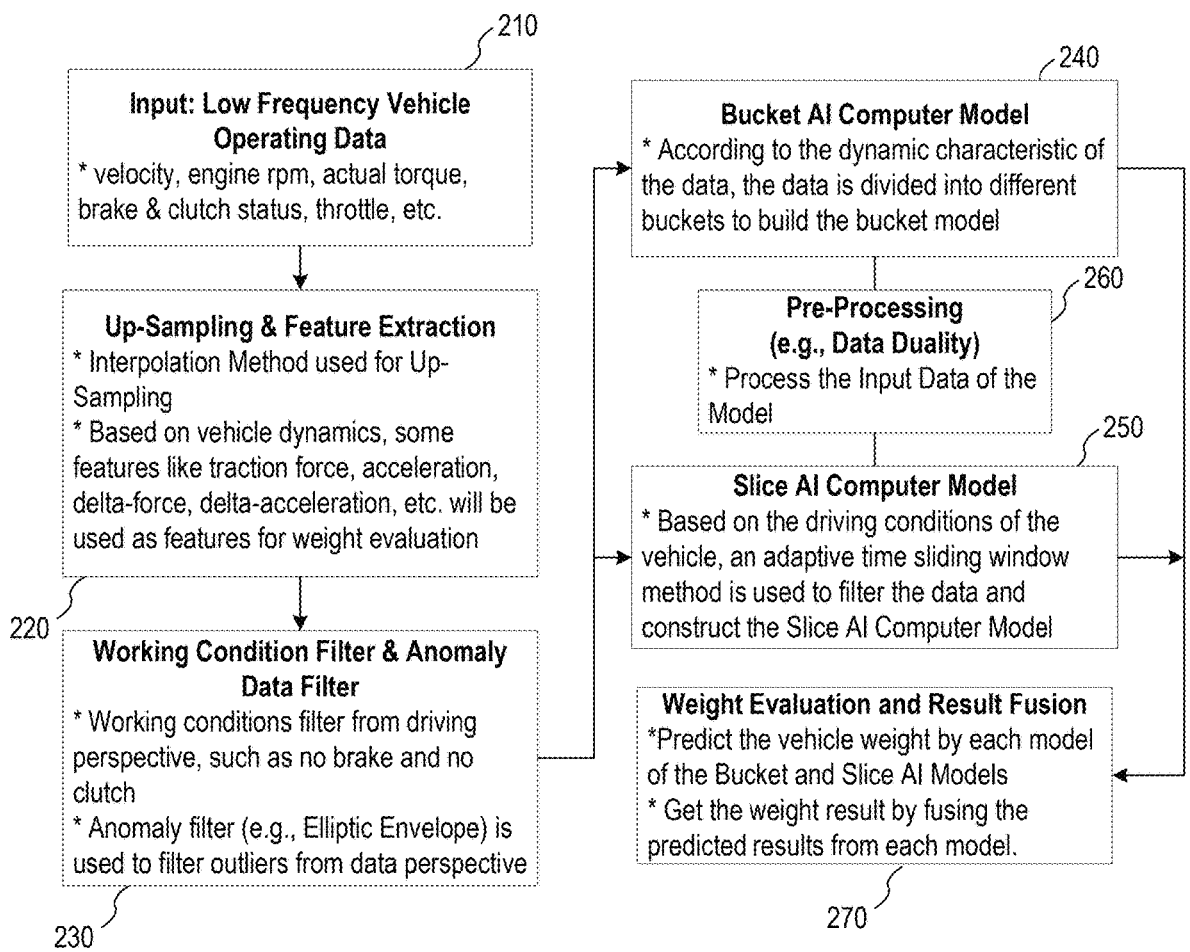
FIG. 2 is a data flow diagram illustrating an example interaction of the components of a vehicle weight artificial intelligence computing system in accordance with one illustrative embodiment.

FIG. 2 is a data flow diagram illustrating an example interaction of the components of a vehicle weight artificial intelligence computing system in accordance with one illustrative embodiment. As shown in FIG. 2, the data flow starts with the low frequency driving data, also referred to as vehicle operation or operating data, being input to the vehicle data processing engine 120 (210). The vehicle data processing engine 120 performs up-sampling and feature extraction (or generation) such as by using an interpolation method to up-sample and then using the vehicle dynamics model (or equation(s)) to determine what features to extract, e.g., features such as traction force, acceleration, delta-force, delta-acceleration, and the like that will be used for vehicle weight estimation/prediction (220). The features extracted/generated from the up-sampled vehicle data are then input to the working condition filter 128 and anomaly filter 126 which filter the features based on working conditions from a driving perspective, and based on anomalies from a data perspective (230).

The resulting filtered valid data 130 are input to the bucket AI model 160 (240) and the slice AI model 150 (250). A pre-processing of the filtered valid data 130 may be applied to the data as part of the processing of the data by the models 150, 160, or as a separate pre-processing operation (260). The bucket AI model 160 divides the input features into buckets based on the dynamic characteristics of the data, with each bucket being separately processed by a machine learning computer model, e.g., linear regression model, to generate a separate estimate/prediction of the vehicle weight based on the features within that bucket. The slice AI model 150 uses an adaptive time sliding window method to filter the data, where valid time slices are identified in the input data and each valid time slide is separately processed by a machine learning computer model, e.g., linear regression model, to generate a separate estimate/prediction of the vehicle weight based on the features within that time slice. It can be appreciated that the number of machine learning computer models implemented in each of the bucket AI model 160 and the slice AI model 150 may differ depending on the characteristics of the input filtered valid dataset 130 expanded by the dataset expansion engine 142 of the pre-processor 140, e.g., the data duality dataset.

The outputs of the bucket AI model 160 and slice AI model 150 are provided to a prediction fusion engine 170 which performs the weight evaluation and result fusion (270). The result fusion may utilize a weighted fusion so as to more heavily weight the output of model 150, 160 which has more machine learning computer models operating on more portions or segments of the expanded filtered valid dataset 130, e.g., a data duality dataset.

As discussed above, the illustrative embodiments implement two AI computer models, each comprising one or more machine learning computer models that process segments or portions of the expanded filtered valid dataset 130, e.g., a data duality dataset. These two models comprise a slice AI model 150 and a bucket AI model. These two models will now be described in greater detail with regard to the slice AI model 150 first and FIG. 3, and thereafter with regard to the bucket AI model 160 and FIGS. 4 and 5.

Figure 3:
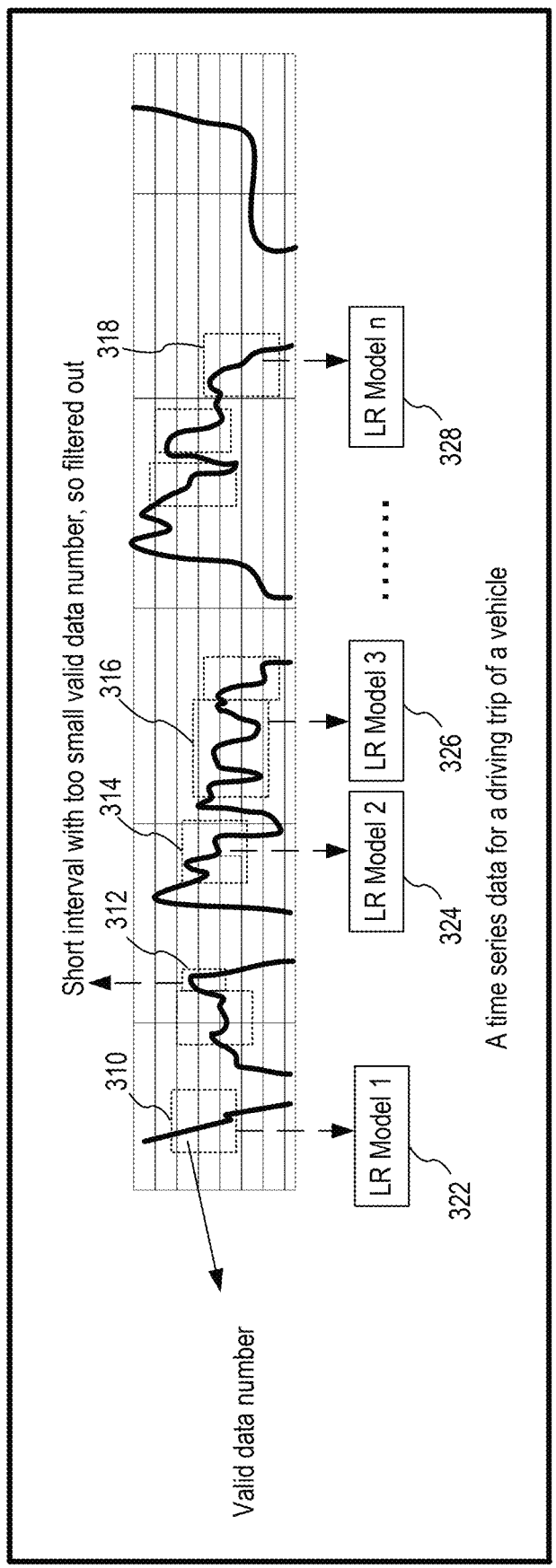
FIG. 3 is an example plot of time series data for a driving trip of a vehicle for explanation of the operation of a slice computer model in accordance with one illustrative embodiment.

FIG. 3 is an example plot of time series data for a driving trip of a vehicle for explanation of the operation of a slice computer model in accordance with one illustrative embodiment. The collected vehicle operating data is collected over a period of time and at low frequency leading to a set of intervals of data which may comprise valid and/or invalid vehicle operating data. The anomaly and working condition filters operate to differentiate these time periods into time slices of valid data and time slices of invalid data. Each time slice has a valid data number, which is the number of valid data samples in the time slice. For the bucket AI model, the valid data number is the number of valid data samples in a bucket.

As shown in FIG. 3, valid time periods or slices 310-318 are identified via the anomaly and working condition filters. For example, in FIG. 3, the time slices 310-318 are filtered data which meet the working conditions, e.g., the 5 working conditions previously discussed, which ensure that the filtered data can be used with the vehicle dynamics model, or equation(s), to estimate/predict vehicle weight. Other portions of the plot may be filtered out for various reasons, such as not meeting the working condition requirements, or being anomalous.

The slice AI computer model generates a separate linear regression (LR) computer model 322-328 for each valid time slice so as to process the data samples or points within that time slice and generate an estimated/predicted vehicle weight. However, some time slices may be too short or may have too few sample points, i.e., the valid data number is too small in this time slice, which cannot support the building of an effective LR computer model. For example, time slice 312 may have too few data samples, i.e., the valid data number is less than a predetermined threshold, to generate an LR computer model and thus, may be filtered out. For example, intervals or time slices with less than 20 sample points may be filtered out. It should be appreciated that the threshold of 20 sample points is only an example and any suitable threshold value may be used depending on the desired implementation. However, the threshold obviously affects the number of LR models that need to be built, i.e., the smaller the threshold, the more LR models need to be built. Therefore, the actual computing resources available may be influential on the setting of the threshold value, e.g., if there are fewer available computing resources, the threshold may be set to cause fewer LR models to be built and executed. It should also be appreciated that before training the LR model for a specific time interval, the expansion of the filtered valid dataset 130 is performed, e.g., a data duality expansion process, to reduce the error of linear regression.

In the depicted example, n LR models 322-328 are built, one for each valid time slice 310-318, and each of the LR models 322-328 independently process the data samples of their corresponding time slice and output a predicted value (the slope of LR model, m) of the vehicle weight (load weight). These predicted values may then be fused in a weighted manner to calculate the final predicted value $m_s$ for the slice AI computer model as followed:

$$m_s = \Sigma_{i=1}^{n} m_{si} * w_{si} \tag{10}$$

where $$w_{si} = \frac{\text{valid data number of time interval } i}{\text{Sum of valid data number of all } n \text{ time intervals}},$$

($\Sigma_{i=1}^{n} w_{si}=1$), $m_{si}$ is the predicted value of vehicle load weight from LR Model i, and $w_{si}$ is the weight coefficient. The weight coefficient is set such that the bigger the valid data number, i.e., the more data points used to train the corresponding LR model, the more likely the LR model will have better accuracy.

With regard to the bucket AI computer model operation, consider FIG. 4 which shows an example diagram of a table of vehicle operating data for various time points in accordance with one illustrative embodiment. As noted above, after applying the working condition and anomaly filters, the filtered valid dataset 130 comprises one or more time intervals or time slices with valid data. However, rather than building a LR model for each time slice, the bucket AI computer model places the valid data points across all the time slices into buckets. For example, as shown in FIG. 4, a table of valid data samples may be provided. The table includes a first column of time points 410, a second column of a first vehicle operating data or feature (torque) 420, a third column specifying a second vehicle operating data or feature (velocity) 430, a fourth column specifying a third vehicle operating data or feature (engine rpm) 440, and so on.

Suppose there are a total of m valid data points from a diving trip of a truck. At each time point, there are key variables such as torque (420), velocity (430), engine rpm (440) and so on, where the key variables are a subset of the data in the duality dataset input to the AI computer models. Each key variable may represent a separate set of buckets in the bucket AI computer model such that the bucket AI computer model performs a bucket operation in each of these key variables to compartmentalize the key variable into separate buckets of values, and each bucket being separately processed by a corresponding LR computer model.

As an example, consider the velocity key variable 510 in FIG. 5. As shown in FIG. 5, the bucket operation performs a quartile of all valid data points of velocity (V) and the result is a set of 4 data "buckets". The "bucket" 1 contains all valid data points whose V are smaller than 25% V. Thus, a LR model (LR1) may be built based on the bucket 1. It should be noted that data expansion by the pre-processor is still utilized, e.g., a data duality expansion for each bucket, and then the LR models are trained separately based on the valid data samples in their corresponding buckets. Similarly, an LR model may be built for each other quartile, i.e., buckets 2 (25%~50%), 3 (50%~75%), and 4 (75%~100%), separately. This means that there are 4 LR models (LR1-LR4) built which each output a separate estimate/prediction of vehicle weight, giving 4 estimated/predicted values for vehicle load weight. These 4 estimates/predictions may then be fused to generate a final predicted value $m_V$ for load weight based on Velocity, where this fusion in one illustrative embodiment may be the average value of the individual estimates/predictions.

This same process may be performed for each of the key variables to thereby obtain separate estimates/predictions of vehicle load weight based on each of the separate key variables, e.g., $m_T$ for torque, $m_R$ for engine rpm, and so on. A final estimated/predicted vehicle load weight $m_b$ for the bucket AI computer model can be calculated as:

$$m_b = \frac{\text{Sum of final predicated value from each key variable}}{\text{Number of key variables}} \tag{11}$$

Thus, through the operation of the slice AI computer model and the bucket AI computer model, separate estimates/predictions of the vehicle load weight are obtained, i.e., $m_s$ from the slice AI computer model and $m_b$ from the bucket AI computer model.

In some illustrative embodiments, a weighted fusion of the output from the slice AI computer model and the bucket AI computer is performed to generate the final estimate/prediction of the vehicle load weight M. The fusion operation for the final predicted value M for vehicle load weight, in accordance with some illustrative embodiments, may be a weighted fusion operation using the number of LR models in each of the slice AI computer model and bucket AI computer model as a way of generating the weights. For example, in some illustrative embodiments, the weighted fusion may be performed in accordance with the following formula:

$$M = \frac{Num_S}{Num_S + Num_b} m_s + \frac{Num_b}{Num_S + Num_b} m_b \tag{12}$$

where $Num_S$ is the total number of LR models in the slice AI computer model and $Num_b$ is the total number of LR models in the bucket AI computer model.

Besides the final predicted value M for load weight, a confidence interval for the estimated/predicted vehicle load weight may also be determined. For the linear regression algorithm, there is a performance metric referred to as the coefficient determination $R^2$. According to the definition of this coefficient, in general $0<R^2<1$. The larger the $R^2$ (closer to 1), the better the LR model performance and the smaller the $R^2$ (closer to 0), the worse the LR model performance.

Therefore, the final predicted value M and $R^2$ may be used to determine an upper and lower limit of the confidence interval as:

$$M_{min} = M * R^2_{mean} \quad (13)$$

$$M_{max} = M * (2 - R^2_{mean}) \quad (14)$$

where $R^2_{mean}$ is the mean value of $R^2$ of all LR models in the slice AI computer model and bucket AI computer model.

It can be seen that if $R^2_{mean}$ is very close to 1 (which means that the general performance of the LR models is very good), then $M_{min}$ and $M_{max}$ would be relatively very close to each other. In this case, the confidence interval for the estimate/prediction of the vehicle load weight is very small. This is the ideal case that is desired to be realized. On the contrary, if $R^2_{mean}$ is very close to 0 (which means that the general performance of LR models is poor), then the difference of $M_{min}$ and $M_{max}$ would be relatively large. In this case, the confidence interval for the estimated/predicted vehicle load weight is relatively large and thus, the result may be not able to be trusted. This is the poor case that is to be avoided.

Ultimate load is a maximum allowable vehicle load weight limit given by a particular authority in the particular implementation, e.g., the Department of Transportation, the transportation company that provides/operates the vehicles, insurance company, or other authority. For example, if the ultimate load of a truck is 20 tons, but its actual load is 40 tons in a trip, and as a result, a traffic accident occurs, this clearly violates the relevant regulations, and the insurance company may not compensate for this accident as it violates the conditions of the insurance contract.

If the Ultimate load of a vehicle is smaller than the lower limit of confidence interval ($M_{min}$), it can almost certainly be determined that the vehicle is overloaded. If the Ultimate load of a vehicle is bigger than the upper limit of confidence interval ($M_{max}$), it can almost certainly be determined that the vehicle is not overloaded. If the Ultimate load is in the confidence interval, the Ultimate load may be compared with the estimated/predicted vehicle load weight M to check whether overload occurred. This can be done by logic of the vehicle weight estimation AI computing system 100, or by other downstream computing system(s) 190, for example, and appropriate alerts and notifications automatically generated and transmitted to appropriate personnel, to the vehicle computing systems, or the like.

Figure 6:
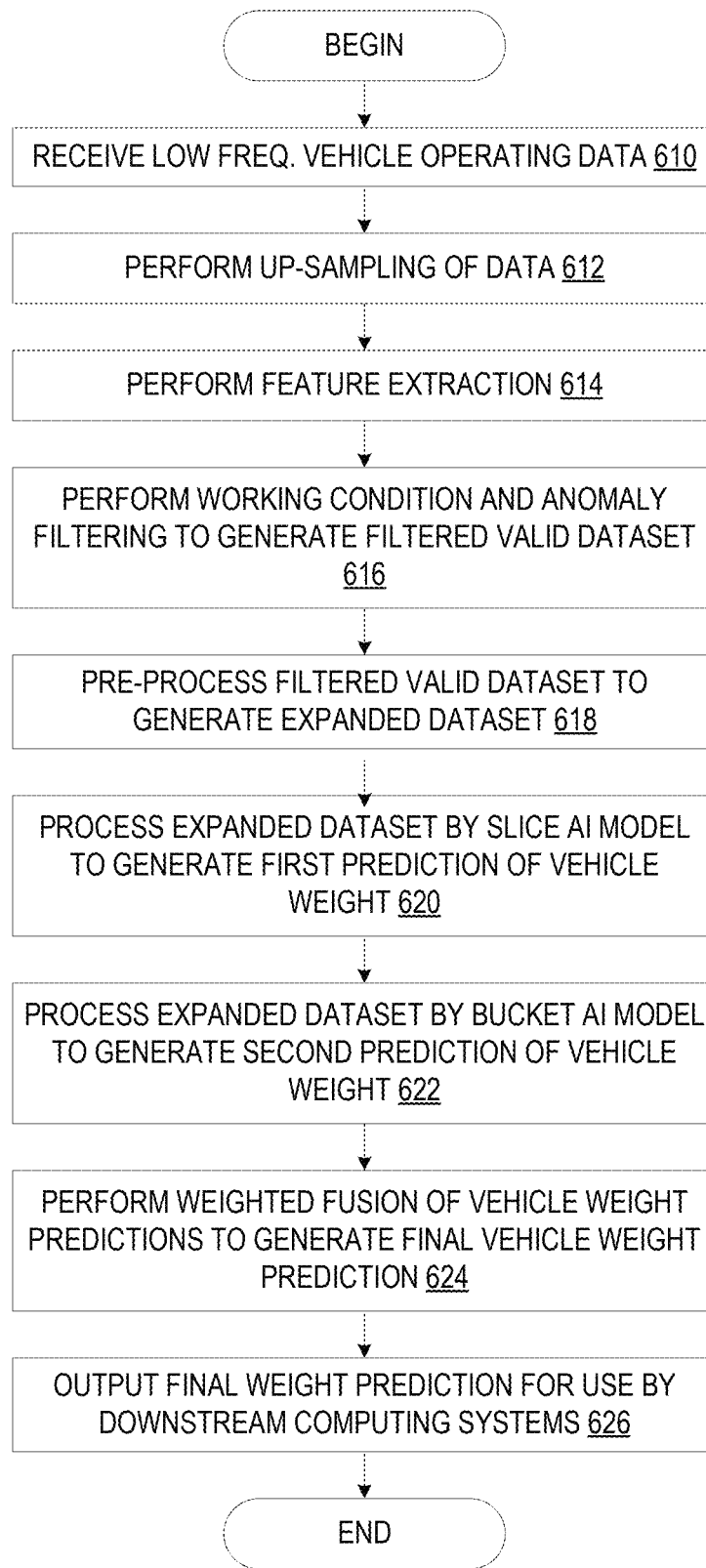
FIG. 6 is a flowchart outlining an example operation of a vehicle weight estimation artificial intelligence computing system in accordance with one illustrative embodiment.

FIG. 6 is a flowchart outlining an example operation of a vehicle weight estimation artificial intelligence computing system in accordance with one illustrative embodiment. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

As shown in FIG. 6, the operation starts by receiving low frequency vehicle operating data from the vehicle on-board sensors and on-board computing system(s) (step 610) Up-sampling is performed on the low frequency vehicle operating data (step 612) and feature extraction is performed on the up-sampled dataset (step 614). The extracted features are then filtered according to the working conditions and anomaly detection filters to generate a filtered valid dataset (step 616). As noted above, the anomaly filter may utilize an Elliptical envelope and the working conditions filter may utilize a set of one or more required working conditions for identifying normal vehicle operation.

The filtered valid dataset is then pre-processed to generate an expanded dataset (step 618). As noted above, this may involve using a data duality expansion operation the generates, for each original data sample in the filtered valid dataset, a corresponding new data sample with opposite sign. The resulting expanded dataset is then input to the slice AI computer model and bucket AI computer model such that the slice AI computer model processes the expanded dataset to generate a first prediction of vehicle weight (step 620) and the bucket AI computer model processes the expanded dataset to generate a second prediction of vehicle weight (step 622). The two predictions are then fused via a weighted fusion operation to generate a final vehicle weight prediction (step 624).

The final weight prediction is output for use by downstream computing systems (step 626) or otherwise output to additional logic on the same computing system for performance of additional operations, such as alert or notification generation and transmission. The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an improved computing tool and improved computing tool functionality for automatically predicting vehicle weight for a moving vehicle, i.e. a vehicle that is in operation. The improved computing tool implements mechanism and functionality, such as the vehicle weight estimation AI computing system 100 in FIG. 1, which cannot be practically performed by human beings either outside of, or with the assistance of, a technical environment, such as a mental process or the like.

Figure 7:
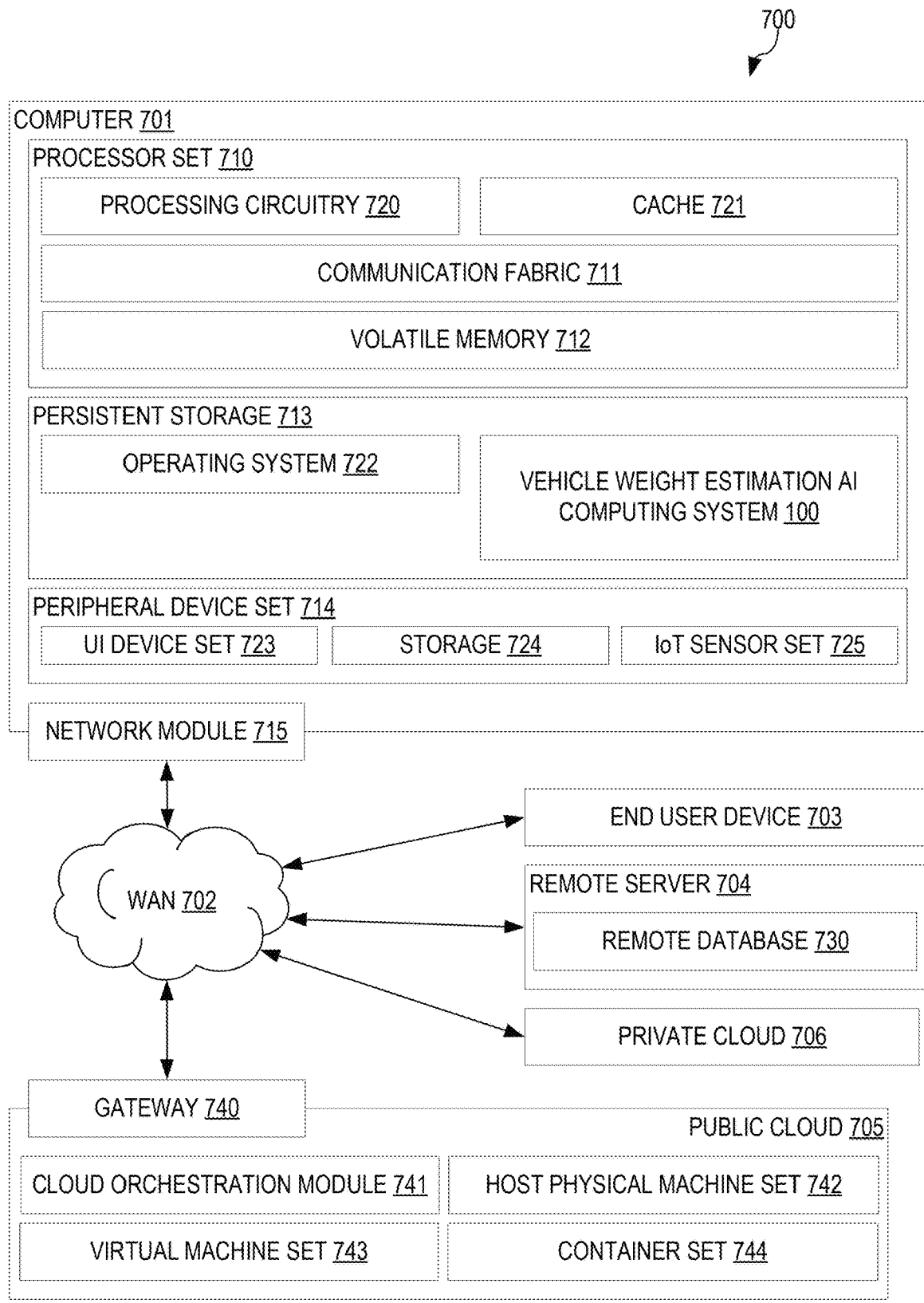
FIG. 7 is an example diagram of a distributed data processing system environment in which aspects of the illustrative embodiments may be implemented and at least

FIG. 7 is an example diagram of a distributed data processing system environment in which aspects of the illustrative embodiments may be implemented and at least some of the computer code involved in performing the inventive methods may be executed. That is, computing environment 700 contains an example of an environment for the execution of at least some of the computer code involved in performing the inventive methods, such as vehicle weight estimation AI computing system 100. In addition to block 100, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 200, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704, may be specifically configured to implement a vehicle weight estimation AI computing system 100. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated vehicle weight estimation/prediction based on low frequency vehicle operating data without the need to install or maintain specialized hardware within the vehicle. To the contrary, the illustrative embodiments operate based on data already collected and reported by existing vehicle sensors and computing systems, thereby reducing installation and maintenance costs for managing vehicles and ensuring compliance with operating requirements of the vehicle.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining operation data of a vehicle from one or more on-board sensors or on-board computing systems of the vehicle;
   extracting one or more features from the operation data of the vehicle;
   filtering the one or more features based on a required working condition of the vehicle to identify intervals of features having valid feature data to thereby generate filtered valid data;
   processing, by a first artificial intelligence (AI) computer model, the filtered valid data based on time slices of the filtered valid data to generate a first prediction of vehicle weight;
   processing, by a second AI computer model, the filtered valid data based on buckets of key variables in the filtered valid data to generate a second prediction of vehicle weight;
   fusing the first prediction with the second prediction to generate a final prediction of vehicle weight; and
   outputting the final prediction of vehicle weight to downstream computing logic.

2. The method of claim 1, wherein the operation data of the vehicle comprises one or more of a velocity of the vehicle, an engine revolutions per minute (rpm), an actual torque, a brake system status, a clutch system status, a throttle status, or a transmission ratio.

3. The method of claim 2, wherein the required working condition of the vehicle comprises a plurality of required states of a plurality of vehicle systems being present during a time period corresponding to the one or more features in order for the features to not be filtered out.

4. The method of claim 3, wherein the plurality of required states comprises two or more of the vehicle not braking, a clutch not being engaged, the velocity of the vehicle being greater than a threshold velocity, the engine rpm being greater than a threshold rpm, or a gear of a transmission being one of a set of gear positions.

5. The method of claim 1, further comprising filtering the one or more features based on an elliptic envelope anomaly filter to thereby remove anomalies from the one or more features.

6. The method of claim 1, further comprising executing a dataset expansion operation on the filtered valid data to generate additional data samples in the filtered valid data prior to processing the filtered valid data by the first AI computer model and second AI computer model.

7. The method of claim 6, wherein the dataset expansion operation comprises a data duality expansion operation that generates new data samples in the filtered valid data for each original data sample in the filtered valid data, but having an opposite sign of a corresponding original data sample.

8. The method of claim 1, wherein:
   the first AI computer model is a slice AI computer model that comprises a machine learning computer model for each valid time slice in the filtered valid data, wherein each machine learning computer model for each valid time slice operates on filtered valid data of a corresponding valid time slice and generates a prediction of vehicle weight, and
   the slice AI computer model combines predictions of vehicle weight from each machine learning computer model to generate the first prediction of vehicle weight.

9. The method of claim 8, wherein combining the predictions of vehicle weight from each machine learning computer model comprises:
   for each prediction of vehicle weight, multiplying the predicted vehicle weight by a weight coefficient that is calculated as a ratio of a valid data number for a corresponding valid time slice to a sum of valid data numbers of all valid time slices, to generate a product value; and
   summing the generated product values to generate the first prediction of vehicle weight.

10. The method of claim 8, wherein the machine learning computer model for each valid time slice is a linear regression computer model.

11. The method of claim 1, wherein:
   the second AI computer model is a bucket AI computer model that comprises a machine learning computer model for each bucket of data samples from the filtered valid data corresponding to a key feature in the one or more features, each machine learning computer model operates on data samples in a corresponding bucket and generates a prediction of vehicle weight; and
   the bucket AI computer model combines the predictions of vehicle weight from each machine learning computer model to generate the second prediction of vehicle weight.

12. The method of claim 11, wherein combining the predictions of vehicle weight from each machine learning computer model comprises averaging the predictions of vehicle weight across all key variables.

13. The method of claim 11, wherein the machine learning computer models are linear regression computer models.

14. The method of claim 1, wherein fusing the first prediction with the second prediction comprises performing a weighted fusion operation, wherein weights applied to the first prediction and the second prediction are determined based on a number of machine learning computer models in each of the first AI computer model and the second AI computer model.

15. The method of claim 1, wherein fusing the first prediction with the second prediction comprises performing a weighted fusion operation in which a first weight applied to the first prediction is a ratio of a number of machine learning computer models in the first AI computer model to a total number of machine learning computer models in both the first AI computer model and the second AI computer model, and wherein a second weight applied to the second prediction is a ration of a number of machine learning computer models in the second AI computer model to a total number of machine learning computer models in both the first AI computer model and the second AI computer model.

16. The method of claim 1, wherein outputting the final prediction of vehicle weight to downstream computing logic comprises processing the final prediction of vehicle weight by the downstream computer logic to determine if the vehicle is being operated in compliance with one or more of predetermined policies, rules, laws, or contractual requirements.

17. The method of claim 1, further comprising performing an interpolation up-sampling operation on the operation data of the vehicle prior to extracting the one or more features.

18. The method of claim 1, wherein the method is performed in a remote computing system remote from the vehicle and wherein the operation data of the vehicle is received from the one or more on-board sensors or on-board computing systems of the vehicle via a wireless data transmission from the vehicle.

19. A non-transitory computer readable medium, storing thereon a computer program product, executed by a processor to:
- obtain operation data of a vehicle from one or more on-board sensors or on-board computing systems of the vehicle;
- extract one or more features from the operation data of the vehicle;
- filter the one or more features based on a required working condition of the vehicle to identify intervals of features having valid feature data to thereby generate a filtered valid data;
- process, by a first artificial intelligence (AI) computer model, the filtered valid data based on time slices of the filtered valid data to generate a first prediction of vehicle weight;
- process, by a second AI computer model, the filtered valid data based on buckets of key variables in the filtered valid data to generate a second prediction of vehicle weight;
- fuse the first prediction with the second prediction to generate a final prediction of vehicle weight; and
- output the final prediction of vehicle weight to downstream computing logic.

20. An apparatus comprising:
at least one processor; and
at least one memory coupled to the at least one processor, wherein the at least one memory comprises instructions which, when executed by the at least one processor, cause the at least one processor to:
- obtain operation data of a vehicle from one or more on-board sensors or on-board computing systems of the vehicle;
- extract one or more features from the operation data of the vehicle;
- filter the one or more features based on a required working condition of the vehicle to identify intervals of features having valid feature data to thereby generate a filtered valid data;
- process, by a first artificial intelligence (AI) computer model, the filtered valid data based on time slices of the filtered valid data to generate a first prediction of vehicle weight;
- process, by a second AI computer model, the filtered valid data based on buckets of key variables in the filtered valid data to generate a second prediction of vehicle weight;
- fuse the first prediction with the second prediction to generate a final prediction of vehicle weight; and
- output the final prediction of vehicle weight to downstream computing logic.

* * * * *